US008669689B2

(12) United States Patent
Moler

(10) Patent No.: US 8,669,689 B2
(45) Date of Patent: Mar. 11, 2014

(54) MOUNTABLE ARM SMART MATERIAL ACTUATOR AND ENERGY HARVESTING APPARATUS

(75) Inventor: Jeffery B Moler, Sarasota, FL (US)

(73) Assignee: Viking AT, LLC, Sarasota, FL (US)

( * ) Notice: Subject to any disclaimer, the term of this patent is extended or adjusted under 35 U.S.C. 154(b) by 41 days.

(21) Appl. No.: 13/203,737

(22) PCT Filed: Jul. 12, 2010

(86) PCT No.: PCT/US2010/041727
§ 371 (c)(1),
(2), (4) Date: Aug. 29, 2011

(87) PCT Pub. No.: WO2011/006164
PCT Pub. Date: Jan. 13, 2011

(65) Prior Publication Data
US 2012/0001518 A1    Jan. 5, 2012

Related U.S. Application Data

(60) Provisional application No. 61/224,585, filed on Jul. 10, 2009, provisional application No. 61/240,001, filed on Sep. 4, 2009.

(51) Int. Cl.
*H01L 41/08* (2006.01)
(52) U.S. Cl.
USPC .......................................... 310/328
(58) Field of Classification Search
USPC ........................................... 310/328
See application file for complete search history.

(56) References Cited

U.S. PATENT DOCUMENTS 4,435,666 A * 3/1984 Fukui et al. ............... 310/328
4,442,372 A   4/1984 Roberts
(Continued)

FOREIGN PATENT DOCUMENTS

JP     09-183241     7/1997
JP     2005-302711   10/2005

*Primary Examiner* — Mark Budd
(74) *Attorney, Agent, or Firm* — William G. Giltinan; Carlton Fields Jorden Burt, PA

(57) ABSTRACT

A smart material actuator comprising a mechanical amplifier with a fixed supporting member, at least one mountable actuating arm, and mechanical web having at least one compliant member attached to the mountable arm and a movable supporting member. A piezoelectric stack is affixed between a first mounting surface on the fixed supporting member and a second mounting surface on the movable supporting member. With the fixed supporting member being substantially rigid, and the piezoelectric stack being affixed between the first mounting surface and the second mounting surface, which are substantially parallel, applying an appropriate electric potential to the piezoelectric stack will cause it to expand substantially without angular movement. The expansion urges the second mounting surface away from the first, thereby causing the compliant members of the mechanical web to flex, thereby moving the mountable actuating arm. The configuration of the web and the length of the mountable arm cause the actuating end of the arm to move across a distance greater than the expansion of the piezoelectric stack. In this way, the expansion of the stack is effectively amplified by the mechanical amplifier. Actuators of this type may be used both to create mechanical motion from electrical energy and to harvest electrical energy from mechanical motion, or sense the degree of such motion. A number of arm designs and means of attachment to external components are disclosed, in addition to methods of generating electricity from mechanical motion and generating vibration using such actuators and methods of tuning the resonant frequency and increasing the efficiency of energy harvesting through resonant operation.

15 Claims, 10 Drawing Sheets

(56) References Cited

U.S. PATENT DOCUMENTS

| | | | |
|---|---|---|---|
| 4,518,887 A * | 5/1985 | Yano et al. | 310/328 |
| 4,547,086 A * | 10/1985 | Matsumoto et al. | 400/124.16 |
| 4,570,095 A * | 2/1986 | Uchikawa | 310/328 |
| 4,633,120 A * | 12/1986 | Sato et al. | 310/328 |
| 5,751,091 A | 5/1998 | Takahashi et al. | |
| 5,828,157 A | 10/1998 | Miki et al. | |
| 6,520,479 B1 | 2/2003 | Sato | |
| 6,548,938 B2 | 4/2003 | Moler et al. | |
| 6,717,332 B2 | 4/2004 | Moler et al. | |
| 6,737,788 B2 | 5/2004 | Moler et al. | |
| 6,759,790 B1 | 7/2004 | Bugel et al. | |
| 6,789,087 B1 | 9/2004 | Sako | |
| 6,834,419 B2 * | 12/2004 | Lopatin et al. | 29/25.35 |
| 6,836,056 B2 | 12/2004 | Oudshoorn et al. | |
| 6,870,305 B2 | 3/2005 | Moler | |
| 6,924,586 B2 | 8/2005 | Moler | |
| 6,975,061 B2 | 12/2005 | Moler | |
| 6,979,933 B2 | 12/2005 | Oudshoorn et al. | |
| 7,040,349 B2 | 5/2006 | Moler et al. | |
| 7,126,259 B2 | 10/2006 | Moler et al. | |
| 7,132,781 B2 | 11/2006 | Moler et al. | |
| 7,190,102 B2 | 3/2007 | VanderSluis | |
| 7,258,533 B2 | 8/2007 | Tanner et al. | |
| 7,368,856 B2 | 5/2008 | Moler et al. | |
| 7,453,187 B2 | 11/2008 | Richards et al. | |
| 7,560,856 B2 | 7/2009 | Chen et al. | |
| 7,564,171 B2 | 7/2009 | Moler et al. | |
| 7,667,375 B2 | 2/2010 | Berkcan et al. | |
| 7,687,977 B2 | 3/2010 | Xu | |
| 2003/0127948 A1 | 7/2003 | Moler et al. | |
| 2004/0263025 A1 | 12/2004 | Moler et al. | |
| 2005/0116583 A1 | 6/2005 | Nishio et al. | |
| 2006/0017349 A1 | 1/2006 | Moler et al. | |
| 2008/0265712 A1 | 10/2008 | Ulm et al. | |
| 2008/0315722 A1 | 12/2008 | Clingman et al. | |
| 2009/0152990 A1 | 6/2009 | Brown et al. | |

* cited by examiner

MOUNTABLE ARM SMART MATERIAL ACTUATOR AND ENERGY HARVESTING APPARATUS

CROSS-REFERENCE TO RELATED APPLICATIONS

This application claims priority from U.S. provisional patent applications Ser. No. 61/224,585 filed Jul. 10, 2009, and Ser. No. 61/240,001 filed Sep. 4, 2009, which are herein incorporated by reference in their entirety.

BACKGROUND

The present invention relates to an actuator apparatus using a piezo or other smart material and having mountable arms that enable customization of the apparatus for different applications. Smart material actuators are known in the art. However, such devices are generally produced in a relatively limited set of fixed sizes and configurations. The present invention corrects these shortcomings by providing an actuator apparatus that enables attachment of arms of different sizes and configurations, thereby enabling a common set of parts to be assembled into different configurations of smart material actuators, customized to suit the demands of different applications. Having options for customizable arms also allows tuning of the resonant frequency of the actuator, thereby allowing for further flexibility in matching actuators to specific applications.

SUMMARY

Disclosed herein, therefore, is a smart material actuator comprising a mechanical amplifier with a fixed supporting member, at least one mountable actuating arm, and mechanical web having at least one compliant member attached to the mountable arm and a movable supporting member. A piezoelectric stack is affixed between a first mounting surface on the fixed supporting member and a second mounting surface on the movable supporting member. With the fixed supporting member being substantially rigid, and the piezoelectric stack being affixed between the first mounting surface and the second mounting surface, which are substantially parallel, applying an appropriate electric potential to the piezoelectric stack will cause it to expand substantially without angular movement. The expansion urges the second mounting surface away from the first, thereby causing the compliant members of the mechanical web to flex, thereby moving the mountable actuating arm. The configuration of the web and the length of the mountable arm cause the actuating end of the arm to move across a distance greater than the expansion of the piezoelectric stack. In this way, the expansion of the stack is effectively amplified by the mechanical amplifier. Actuators of this type may be used both to create mechanical motion from electrical energy and to harvest electrical energy from mechanical motion.

A number of arm designs and means of attachment to external components are also disclosed. In addition, methods of generating electricity from mechanical motion, generating vibration using such actuators, and using such actuators as sensors are discussed. Finally, a method of tuning the resonant frequency of such an actuator through the selection and attachment of mountable actuating arms, and a method of increasing the efficiency of energy harvesting through resonant operation, are also disclosed

BRIEF DESCRIPTION OF THE DRAWINGS

Other features in the invention will become apparent from the attached drawings, which illustrate certain preferred embodiments of the apparatus of this invention, wherein.

DETAILED DESCRIPTION

Preferred embodiments of the present invention are herein described with reference to FIGS. 1-20 in which distinct elements are referred to with unique element numbers, with similar elements in different embodiments generally having the same last two digits. By way of example therefore, while element fixed supporting member 20 is the same element used in multiple embodiments illustrated in FIGS. 1, 2, 3, 4, 6, 19, 20, mountable actuating arms 40, 140, 240, 340, 440, 540, 640, 740, and 840 illustrated in the same figures are each separate embodiments of a mountable actuating arm suitable for use with different embodiments of the present invention. For convenience, therefore, when reference is made herein to a range of element numbers, that reference is a shorthand reference being made to similar elements with element numbers having the same last two digits, but different first digits. By way of example, a reference to mountable actuating arm 40-840 is thus a reference to all of the embodiments of mountable actuating arms 40, 140, 240, 340, 440, 540, 640, 740, and 840. In contrast, a reference to a specific element number alone for example a reference to mountable actuating arm 40), is a reference to a specific embodiment of such element as shown in the figures, but is not necessarily a reference to other embodiments shown elsewhere in the figures for example mountable actuating arms 140, 240, 340, 440, 540, 640, 740, and 840) unless otherwise is clear from the context. Other commonalities and differences between embodiments of similar components will be apparent to those of ordinary skill in the art from the text of this detailed description.

While the following describes preferred embodiments of this invention, it is to be understood that this description is to be considered only as illustrative of the principles of the invention and is not to be limitative thereof, as numerous other variations, all within the scope of the invention as claimed, will be readily apparent to those of skill in the art.

The term "adapted" as used herein shall mean sized, shaped, configured, dimensioned, oriented and arranged as appropriate.

Where specific examples are used herein, such examples are intended to be illustrative and not limiting.

The following references are hereby incorporated herein in their entirety so as to provide additional disclosure that may be found helpful in further understanding the present invention: PCT Application No. PCT/US2010/41461 and U.S. Pat. Nos. 6,717,332; 6,548,938; 6,737,788; 6,836,056; 6,879,087; 6,759,790; 7,132,781; 7,126,259; 6,870,305; 6,975,061; 7,368,856; 7,564,171 and 6,924,586.

Figure 1:
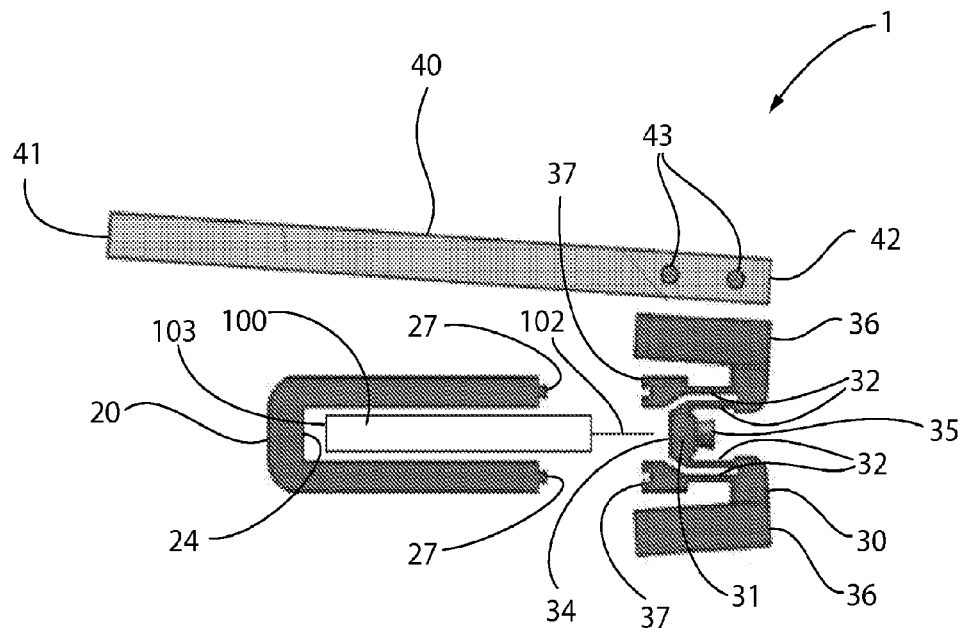
FIG. 1 is an exploded side view of a preferred embodiment of the actuator of the present invention having a solid mountable actuating arm comprising two opposing attachment tabs.
Figure 2:
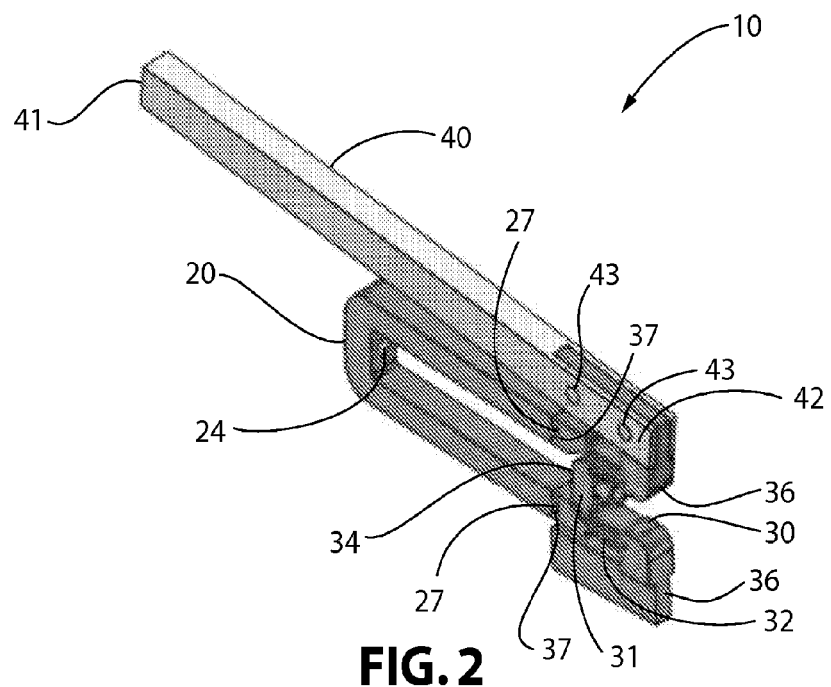
FIG. 2 is a perspective view of the mechanical amplifier of the embodiment shown in FIG. 1 when assembled.

FIG. 1 illustrates a preferred embodiment of the mountable arm smart material actuator apparatus 1 of the present invention, with FIG. 2 illustrating a perspective view of the mechanical amplifier 10 of FIG. 1 when assembled without piezoelectric stack 100. As will be readily recognized by those of ordinary skill in the art, the components of the apparatus of the present invention may be manufactured in a variety of sizes and materials adapted to the needs of differing applications. Allowing for manufacture of the components of mechanical amplifier 10-810 such that different mountable actuating arms 40-840 may be mounted on mechanical webs 30-830 improves flexibility by enabling parts to be assembled in different configurations to create varieties of actuators adapted to meet the requirements of diverse applications. Longer arms, for example, may be used in applications requiring a greater degree of motion (or stroke) and less force, while shorter arms may be used in applications requiring a greater degree of force with less range of motion. In addition, by varying the weight and configuration of said arms, the resonant characteristics of actuator 1 (and mechanical amplifiers 10-810) can be modified, thereby enabling tuning of the actuator to resonate (or avoid resonation) at a particular frequency. Further, different configurations of mountable actuating arms may be used to facilitate attachment configuration and geometry and to adjust the direction of the force applied. The result is an improved actuator based on replaceable parts that may be produced in higher volume at lower cost, while simultaneously enabling use in a wider variety of applications.

Actuator 1 comprises mechanical amplifier 10 and piezoelectric stack 100. To facilitate flexibility and reuse of common parts in different actuator configurations, mechanical amplifier 10 comprises discrete components including a fixed supporting member 20, 20' having a first mounting surface 24, 24'. Fixed supporting member 20, 20' may be manufactured in a variety of sizes suitable for use with piezoelectric stacks 100 of different sizes. Fixed supporting member 20, 20' comprises attachment ends 27, 27' that are adapted to be attached to mechanical webs 30-830 as shown in the figures. Such attachment may conveniently be made by adapting attachment ends 27 to mate with web attachment end 37, 137, 337 such that fixed supporting member 20, 20' is fixedly attached to mechanical webs 30, 130, 330 such that expansion of piezoelectric stack 100 will not cause fixed supporting member 20, 20' and mechanical webs 30, 130, 330 to separate during ordinary operation. In these illustrated embodiments, the method of attachment is to form attachment ends 27 to be wider at their outer ends, and to form web attachment ends 37, 137, 337 to be narrower at their outer ends. In this way, attachment ends 27 of fixed supporting member 20, 20' may pressed into web attachment ends 37, 137, 337 from the side, with the narrow and wider portions of attachment ends 27 and web attachment ends 37, 137, 337 resisting separation when piezoelectric stack 100 is activated. The reverse configuration is also possible with web attachment ends 237, 437, 537, 637, 737, 837 being wider at their outer ends, while attachment ends 27' are narrower at their outer ends. As will be apparent to those of skill in the art, a wide variety of attachment means may be used including a wide variety of locking shapes, mechanical fasteners, welding or high-strength adhesives to achieve the same result. The embodiments of attachment ends 27, 27' and web attachment ends 37-837 illustrated are but two illustrative set of such attachment means.

By adapting fixed supporting member 20, 20' to attach to mechanical webs 30-830, it becomes possible to manufacture a standard set of components that can be combined in different ways to generate different actuator embodiments. For example, fixed supporting member 20, 20' could be formed in a variety of lengths to accommodate different sizes of piezoelectric stack 100. Alternatively, fixed supporting member 20, 20' could be formed of one material (for example stainless steel), while mechanical webs 30-830 are manufactured of a different material (for example aluminum or a different grade of stainless steel) thereby allowing for the mating of common fixed supporting members 20, 20' with mechanical webs 30-830 having different weights, strengths, yield points, or other characteristics. Stainless steel is one preferred material for both fixed supporting member 20, 20' and mechanical webs 30-830 as it is strong and long-lasting. Aluminum, carbon fiber, plastics, ceramics, and other steel alloys can also be used to create actuators of different weights, strengths and configurations and, as is discussed further below and in the incorporated references, with different resonant frequencies.

Fixed supporting member 20, 20' serves the purpose of rigidly supporting piezoelectric stack 100 between first mounting surface 24 and second mounting surface 34-834 of mechanical webs 30-830, and providing suitable preload compression as is discussed below and in the incorporated references. First mounting surface 24 is preferably shaped to connect firmly and evenly with piezoelectric stack 100, with an optional insulator (not shown). Firm and even mating between first mounting surface 24 and piezoelectric stack 100 is desirable as it acts to minimize angular flexing of piezoelectric stack 100 during operation, therefore improving the operational lifetime and efficiency of actuator 1. The amount of preload applied to piezoelectric stack 100 can also be varied by incorporating an adjustable mechanical compression device (such as a threaded fastener with a plate to serve as first mounting surface 24 (not illustrated)) into fixed supporting member 20. This allows the same fixed supporting member 20, 20' and piezoelectric stack 100 to be utilized with varying and adjustable levels of preload. As is discussed in the incorporated references, selecting the appropriate preload can increase the efficiency of the actuator.

Mechanical amplifier 10-810 further comprises mechanical webs 30-830 having opposed second mounting surface 34-834 on movable supporting member 31-831. As is noted above, piezoelectric stack 100 is affixed between first mounting surface 24 and second mounting surface 34-834. While adhesives may be used to secure piezoelectric stack 100, in certain embodiments such adhesives are not necessary as the compressive force supplied by fixed supporting member 20, 20' and mechanical webs 30-830 will generally be sufficient to secure piezoelectric stack 100 in place. It is accordingly convenient for fixed supporting member 20, 20' to be substantially rigid and for second mounting surface 34 -834 to be parallel and directly opposed to fixed supporting member 20, 20' and first mounting surface 24. As with first mounting surface 24, it is desirable that second mounting surface 34-834 be adapted to meet piezoelectric stack 100 firmly and evenly. In this way, upon application of a suitable electrical potential to piezoelectric stack 100, piezoelectric stack 100 will expand substantially without movement of fixed supporting member 20, 20' and substantially without angular movement of piezoelectric stack 100 caused by flexing, thereby allowing for longer duty cycles and more efficient operation. Although not illustrated, it is easily understood that first mounting surface 24 and/or second mounting surface 34-834 may also incorporate cavities, ridges, fasteners or similar features adapted to support and secure piezoelectric stack 100, which may be open or encapsulated in a suitable protective and/or insulating material.

Piezoelectric stack 100 will typically incorporate a negative electrode 103 on the end touching fixed supporting member 20, 20' and a positive electrode 102 on the opposing end, which electrode 102 is adapted to extend through strain relief element 35 (illustrated but not separately numbered on FIGS. 2-11, 19 and 20), thereby allowing for an electrical connection to be established. Where the body of mechanical amplifier 10-810 is conductive, the body itself may then be utilized as the ground for piezoelectric stack 100, while positive electrode 102 is used to complete the circuit. In such embodiments, appropriate insulating material (not illustrated), many of which are known in the art, may be used inside strain relief element 35 and, if necessary depending on the configuration of piezoelectric stack 100, between second mounting surface 34-834 and piezoelectric stack 100, to avoid short circuits. Where the body of mechanical amplifier 10-810, and in particular fixed supporting member 20, is non-conductive, an additional negative electrode (not illustrated) is required.

Many varieties of piezoelectric materials (materials that expand when an electric potential is applied or generate an electric charge when mechanical force is applied) are known in the art and may be adapted for use in piezoelectric stack 100, which may be, for example, a stack formed of alternating layers of ceramic piezoelectric material fired together (a so-called co-fired multilayer ceramic piezoelectric stack such as those available from suppliers including NEC) or a stack formed of layers of material cut from single crystal piezoelectric materials. As discussed herein, the term piezoelectric material (used to form piezoelectric stack 100) also includes so-called "smart materials," sometimes created by doping known piezoelectric materials to change their electrical or mechanical properties. Thus a smart material actuator is an actuator as described herein using a piezoelectric stack 100, with the term piezoelectric stack referring to both stacks made of traditional piezoelectric materials and so-called smart materials.

Mechanical amplifiers 10-810 further comprise mechanical webs 30-830 having compliant members 32-832. Compliant members 32-832 are adapted such that urging second mounting surface 34-834 away from first mounting surface 24 will cause compliant members (which may sometimes be referred to herein as mechanical links) 32-832 to flex, thereby causing actuating arms 40-840 to move toward fixed supporting member 20. The longer mountable actuating arms 40-840 are, the greater the movement at their actuating ends 41-841. Accordingly, the design of mechanical amplifiers 10-810 amplifies the mechanical motion created by piezoelectric stack 100 into mechanical motion at the actuating ends 41-841 of actuating arms 40-840 across a distance greater than the expansion of piezoelectric stack 100. In this way, actuator 1 may be activated by applying an electric potential to piezoelectric stack 100, thereby causing it to expand and urge second mounting surface 34-834 back, which causes corresponding but amplified movement of actuating arms 40-840. As is discussed further below, reverse operation is also possible in which actuating arms 40-840 are moved apart by a mechanical force, thereby causing second mounting surface 34-834 to compress piezoelectric stack 100, which in turn causes piezoelectric stack 100 to generate an electric potential which can then be discharged into an electrical load such as a rechargeable power source such as a rechargeable battery (not shown). Accordingly, it is understood that actuator 1 may be used as an actuator that creates mechanical motion from electrical energy by applying an appropriate electrical potential to piezoelectric stack 100, or as a generator that harvests electrical energy from mechanical motion by attaching actuating arms 40-840 to a source of mechanical motion such as a vibrating or oscillating surface (for example a pump housing), and then discharging the electric potential created by piezoelectric stack 100 into an energy storage device such as a rechargeable battery or a capacitor. As sources of otherwise wasted mechanical motion (e.g. engine vibration, vibrating pipes, swaying support members, thermally expanding components, etc.) are myriad in many types of apparatus, the present invention provides a very adaptable energy harvesting device that can be used in an almost unlimited number of applications.

In addition to being used as a harvester or electrical energy, actuators according to the present invention may be used as sensors. The amount of electric potential (or voltage) generated by piezoelectric stack 100 will be proportional to the amount of movement of actuator arm(s) 40-840. Accordingly, by analyzing the voltage generated, the existence and/or degree of movement of mountable actuating arms 40-840 can be determined. Accordingly, also disclosed herein is a method of sensing motion with a smart material actuator 1 by connecting mountable actuating arm or arms 40-840 to a source of mechanical motion and reading the voltage generated by piezoelectric stack 100. That voltage may then be used to indicate the amount of movement experienced by mountable actuating arms 40-840 as the electric potential generated will be proportional to the amount of movement. In this way, the degree of motion can be sensed either at a given instant or over a period of time. Amplification and signal processing may be required to translate the signal generated by such a sensor into usable information. Such amplification and signal processing means, however, are well understood in the art and need not be discussed further herein.

The replaceable nature of mountable actuating arms 40-840 is especially helpful in sensor applications. For example, if the sensor is to measure fluid flow, mountable actuating arms 40-840 could be adapted to include a paddle with or without gaps such that the paddle would react to fluid flow, but would not overly impede it. Different and potentially larger paddles could then the used to allow sensing of the flow of a gas. Accordingly it is understood that the separate and mountable actuating arms 40-840 of the present invention allow for tremendous flexibility by allowing the same components to be used in a variety of applications with changes only to an actuator arm.

It will be understood by those of skill in the art that actuators 1 according to the present invention may have one or more mountable actuating arms 40-840. As is illustrated in the figures and discussed further below, mechanical webs 30-830 further comprise various means of mounting mountable actuating arms 40-840, preferably incorporated on shoulders 36-836 respectively of mechanical webs 30-830 respectively. While at least one mountable actuating arm 40-840 will generally be attached to shoulders 36-836, it is also possible to have two mountable actuating arms 40-840 attached, one an upper mountable actuating arm 40-840 attached to one shoulder 36-836, and the other a lower mountable actuating arm 40-840 attached the other shoulder 36-836. Examples of such embodiments are illustrated in FIGS. 6, 9, 10, 11, 19, and 20. While not illustrated, it is readily apparent that the present invention also lends itself to embodiments where upper actuating arm 40-840 and lower actuating arm 40-840 are of different materials or configurations, thereby allowing for use in still further applications. Alternatively, only a single mountable actuating arm 40-840 might be used, with either fixed supporting member 20, 20' or other shoulder 36-836 being mounted to a structure that provides an opposing force against which the force of mountable actuating arm 40-840 may operate.

The operational dynamics of mechanical amplifier 10-810 constrain the design of mechanical links 32-832 and may be adapted such that varying levels of actuating force and stroke are generated by piezoelectric stack 100. By attaching different mountable actuating arms 40-840, further flexibility may be achieved by creating configurations with different stroke lengths at the actuating end 41-841 of mountable actuating arm 40-840 by adjusting the arm length, with longer arms having longer stroke lengths and less force, while shorter harms have greater force, but shorter stroke lengths. Other variations in actuating arm design are also possible, including curved or angled arms or arms with different attachment means as are further described below. Allowing for mountable actuating arms 40-840 to mount to mounting means on shoulders 36-836 thus allows for a wide variety of actuators to be assembled from pre-manufactured components, thereby allowing for the creation of many different configurations adaptable to many different applications.

As is illustrated in FIGS. 1 and 2, one means of mounting actuating arm 40 to shoulders 36 of mechanical web 30 is to form shoulders 36 narrower than mountable actuating arm 40, and to form two opposing tabs 42 adapted to surround shoulder 36 on mountable actuating arm 40. Holes 43 in tabs 42 may then be used as welding points or, as points though which holes may be drilled in shoulder 36 and mechanical fasteners (not illustrated) used.

Figure 3:
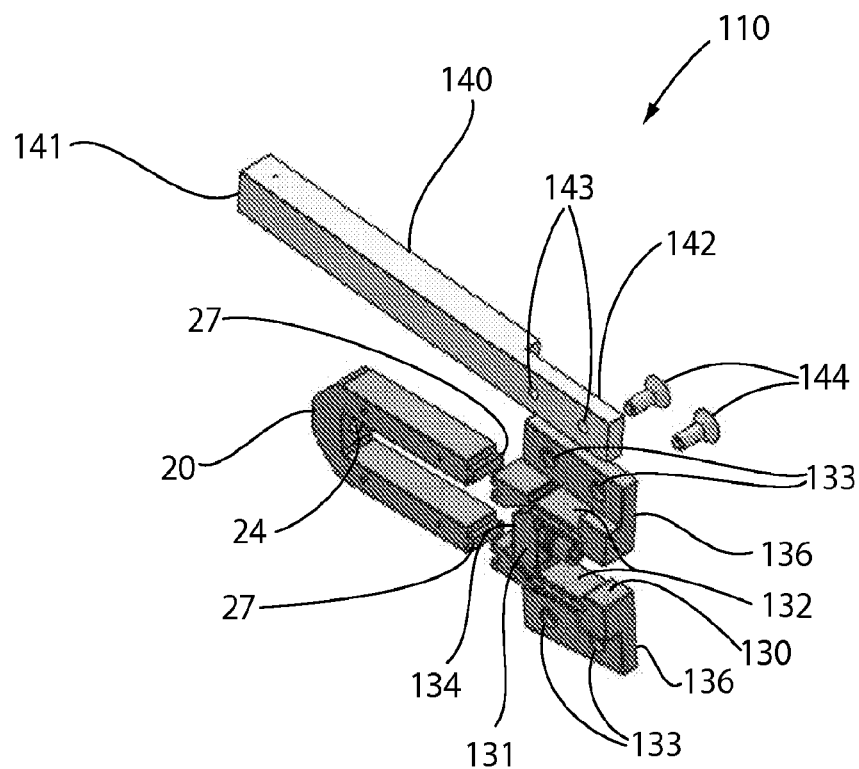
FIG. 3 is an exploded perspective view of an embodiment of a mechanical amplifier suitable for use with present invention and having a solid mountable actuating arm with a single attachment tab.
Figure 4:
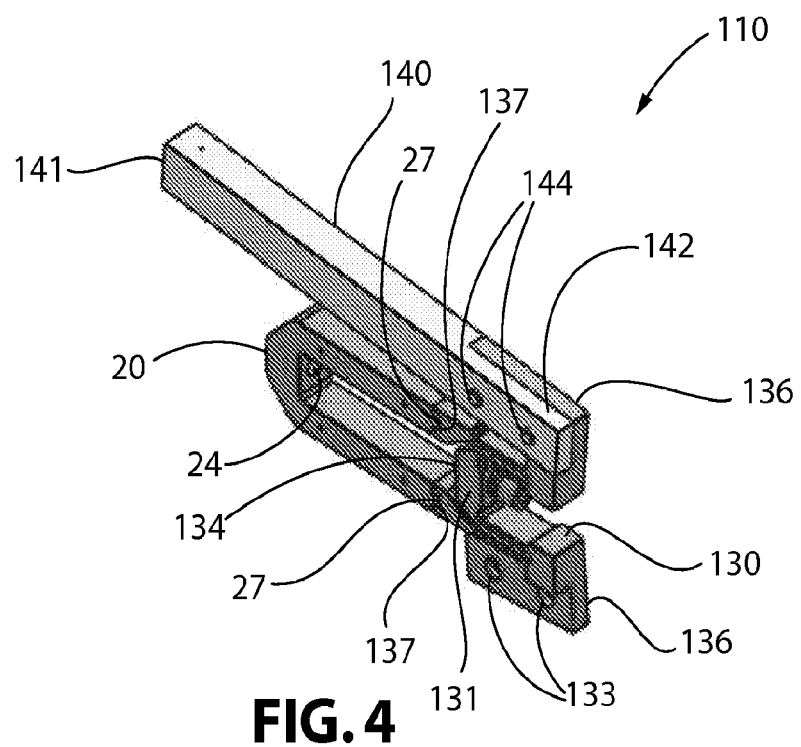
FIG. 4 is a perspective view of the mechanical amplifier embodiment of FIG. 3 when assembled.

An alternate attachment means is illustrated in FIGS. 3 and 4. In such embodiments, shoulder 136 has preferably two holes 143 through which fasteners 144 may pass substantially perpendicular to the lengthwise axis of mountable actuating arm 140. Mountable actuating arm 140 includes matching holes 143 to receive fasteners 144. In the event fasteners 144 are threaded, holes 143 may be tapped to receive them. Alternatively, non-threaded fasteners such as rivets or self tapping fasteners or threaded fasteners with nuts may also be used. As will be apparent, having more than two holes 143 and more than two fasteners 144 is also possible.

Figure 5:
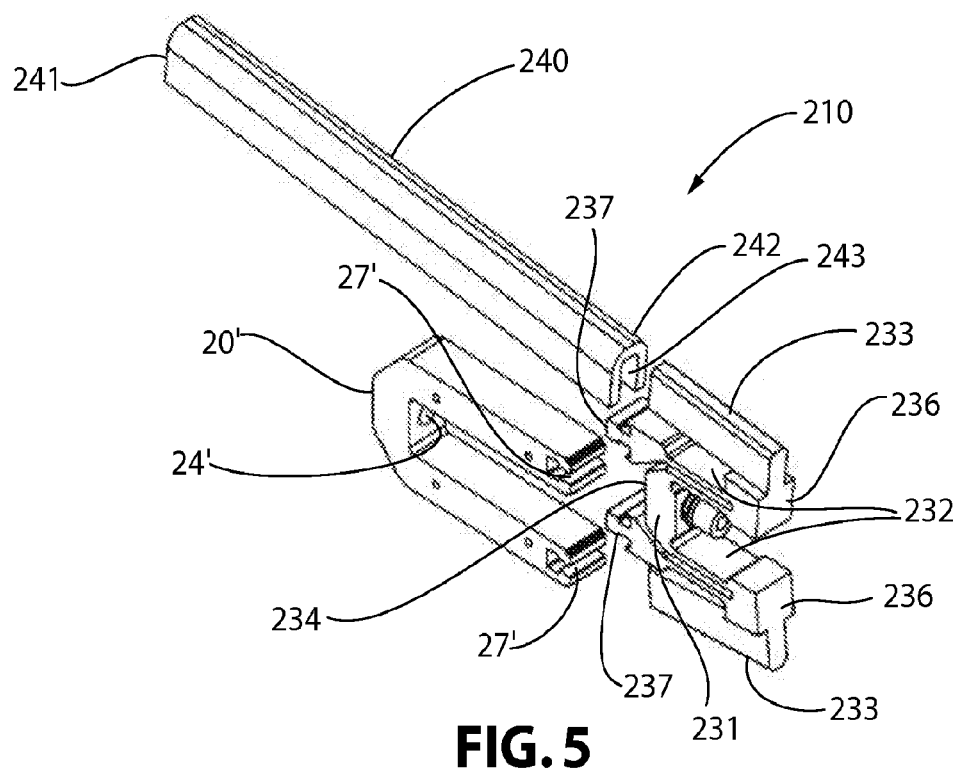
FIG. 5 is an exploded perspective view of an embodiment of a mechanical amplifier suitable for use with present invention and having a channel-shaped actuating arm.

FIG. 5. Illustrates another alternate attachment means in which mountable actuating arm 240 comprises a channel 243. It is understood that the outer dimensions of actuating arm 240 may, in fact be virtually any shape. By channel-shaped, it is meant only that one surface of mountable actuating arm 240 includes a female channel 243 adapted to receive a male track 233 integral to shoulder 236. Mountable actuating arm 240 may then be assembled onto shoulder 236 by sliding or pressing it onto track 233. Of course, a wide variety of channel and track profiles may be used, including those with ridges and matching recesses (not shown), which may improve the strength of the mounting in certain applications. If the friction and mechanical strength created by male track 233 and channel 243 of mountable acting arm 240 are not sufficient for a given application, adhesives (including epoxies), pressing, clamping, or mechanical fasteners may be used to increase strength. It is noted that one advantage of this embodiment is that mountable arms 240 may be manufactured in long lengths and then cut to size for a given application without the need to pre-manufacture and drill different arm lengths.

Figure 6:
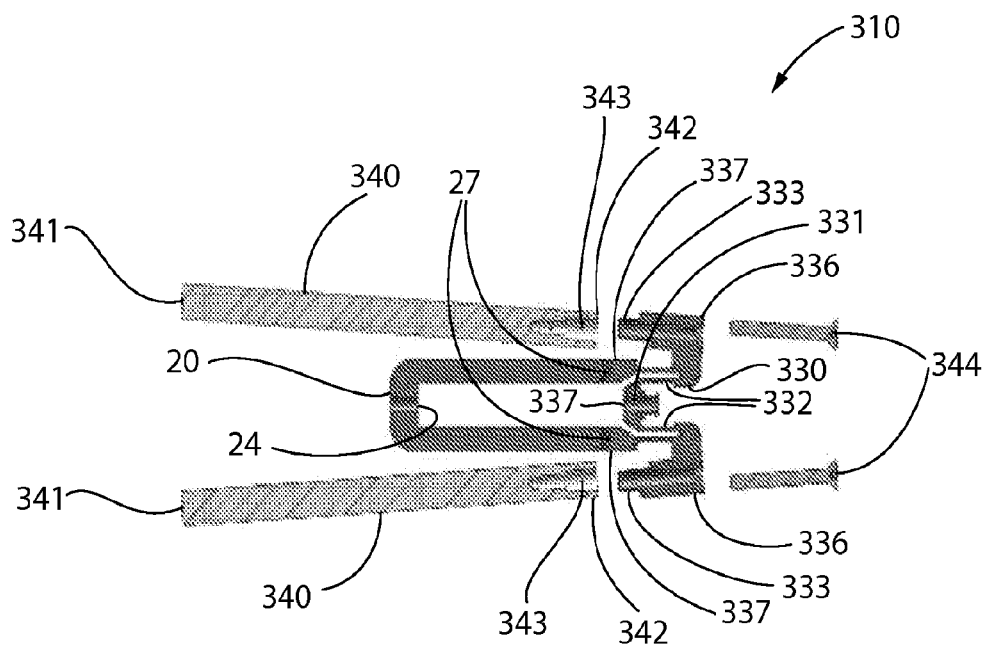
FIG. 6 is an exploded side view of an alternate embodiment of a mechanical amplifier suitable for use with the present invention and having solid mountable actuating arms attached by mechanical fasteners.

FIG. 6 illustrates yet another attachment means in which mountable arms 340 comprise a preferably tapered hole 343 extending parallel to the lengthwise axis of mountable arm 340. Shoulders 336 include extensions 333 adapted to engage holes 342. Threaded fasteners 344 then pass through shoulders 336 and extensions 333 to engage and capture hole 343 when tightened. As is well understood, hole 343 may be pre-tapped with threads adapted to receive fastener 344, or fastener 344 may be of a self-tapping variety. By tightening fastener 344, a secure mechanical mounting may be achieved.

Figure 7:
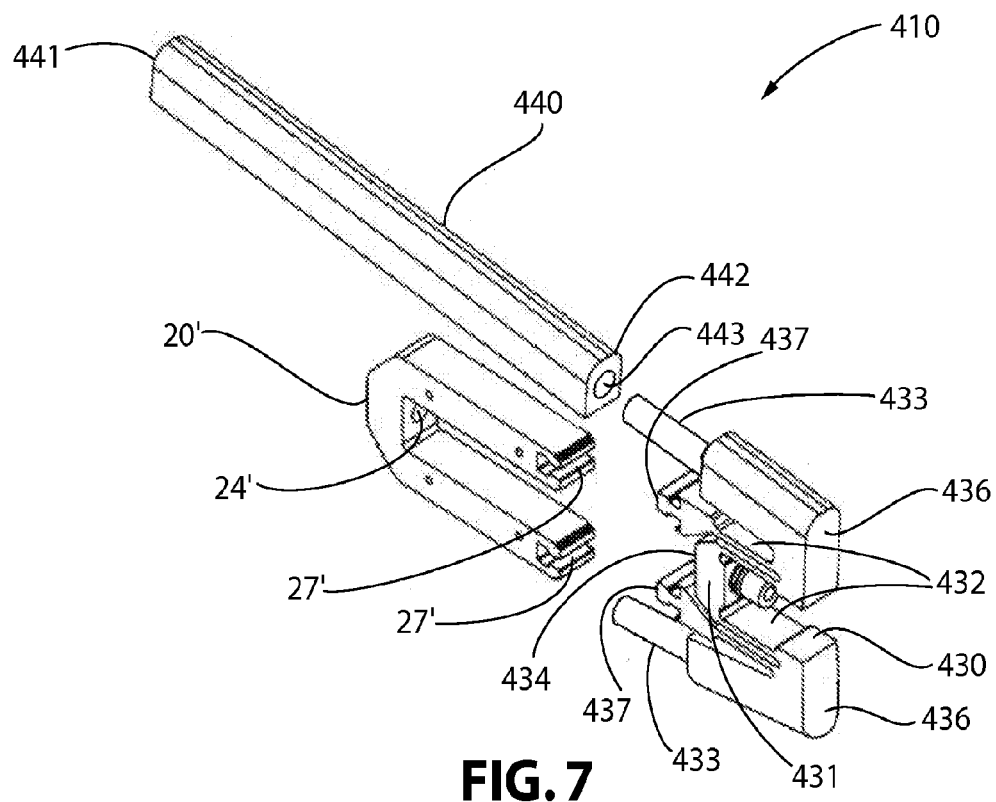
FIG. 7 is an exploded perspective view of a preferred embodiment of a mechanical amplifier suitable for use with the present invention and having press-fitted mountable actuating arm.
Figure 8:
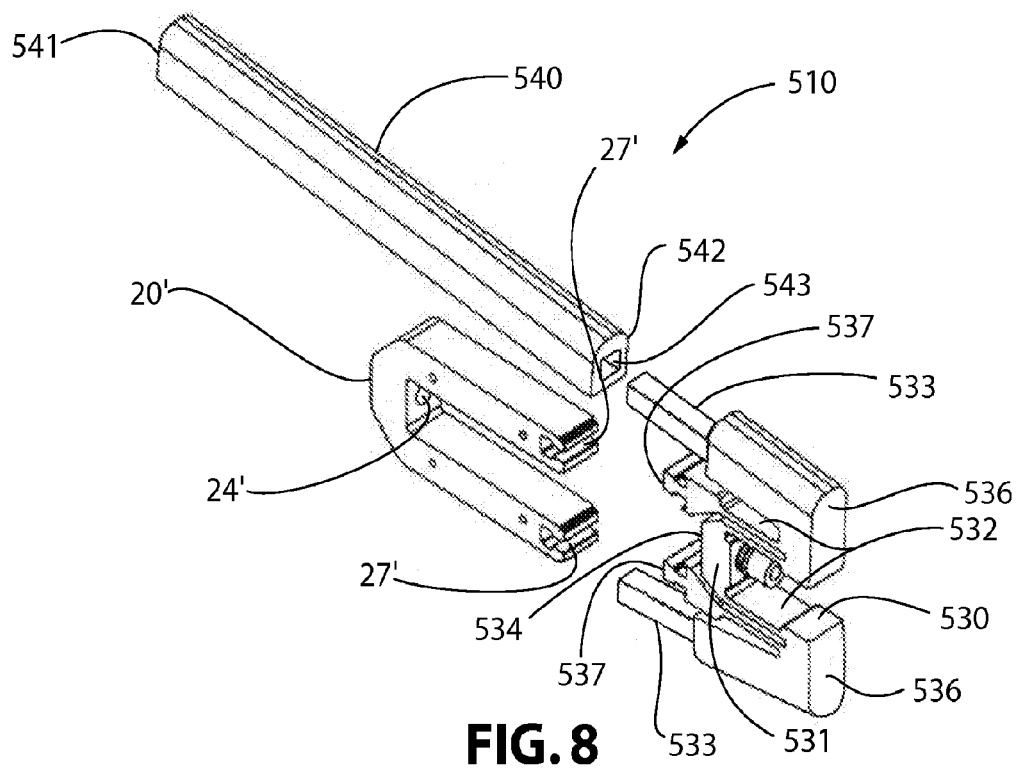
FIG. 8 is an exploded perspective view of an alternate preferred embodiment of a mechanical amplifier suitable for use with the present invention and having a press-fitted mountable actuating arm.

FIGS. 7 and 8 illustrate a further attachment means in which shoulders 436, 536 further comprise extensions 433 and 533. Mountable actuating arm 440, 540 comprise matching receptacles 443, 543 with substantially the same shape and substantially identical or slightly smaller size. H such embodiments, attachable actuating arm 440, 540 may be said to have an outside perimeter and an inside perimeter, with receptacle 443, 543 being formed by the inside perimeter. It will be understood that the outside perimeter and inside perimeter need not be the same shape and that the inside perimeter need not be concentric with the outside perimeter, so long as the insider perimeter is adapted to receive extension 433, 533.

Mountable actuating arms 440, 540 may then be mounted on mechanical webs 430, 530 by means of pressing mountable actuating arms 440, 540 onto extensions 433 and 533, thereby press fitting the arm onto mechanical web 430, 530. Receptacles 443, 543 may extend entirely through mountable arms 440, 540, or may extend only through a portion. As with mountable actuating arm 240, if receptacles 443 and 543 extend through the entire arm length, then mountable actuating arms 440, 540 may be manufactured in long lengths and cut to size as needed prior to mounting. In the event that additional strength is needed, adhesives including epoxies may be applied to extensions 433, 533 and/or receptacles 443, 543 prior to mounting. Clamps or mechanical fasteners (not shown) such as set screws may also be used to provide additional strength. If receptacles 443, 543 are slightly smaller than extensions 433, 533, actuating arms 540, 440 may be heated prior to fitting so that receptacles 443, 543 enlarge slightly to allow fitting and then shrink when cooled to create a tighter attachment.

Figure 9:
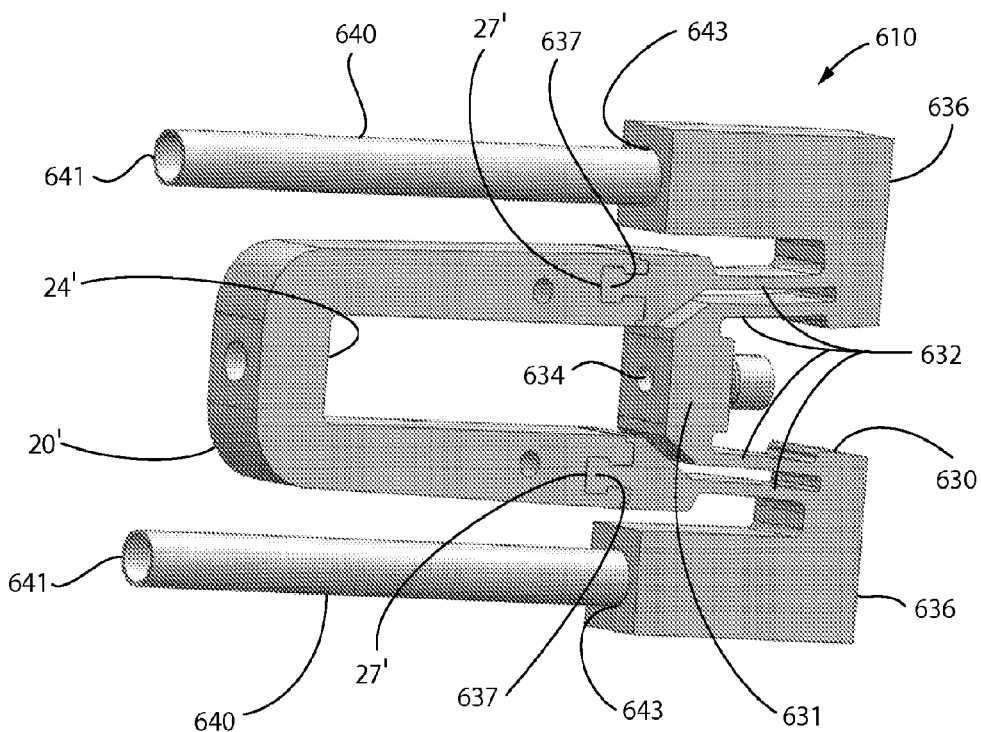
FIG. 9 is a perspective view of a further preferred embodiment of an assembled mechanical amplifier suitable for use with the present invention and having press-fitted mountable actuating arms.

A similar attachment means is illustrated in FIG. 9. Shoulders 636 comprise receptacles 643 adapted to receive mountable actuating arms 640. Where the outside perimeter of mountable actuating arms 640 is substantially identical in shape and either substantially identical or slightly larger in size than receptacle 643, mountable actuating arm 640 may be mounted by press fitting it into receptacle 643 which may or may not extend entirely through shoulder 636. In one preferred embodiment for this attachment means, arms 640 are hollow tubes of carbon fiber, making for a strong arm that is also light in weight. It will be understood by those of skill in the art that, while adapting receptacles 643 to receive round mountable actuating arms 640 is preferred, other receptacle and arm shapes may also be used. It will also be understood that where additional strength is required, adhesives including epoxies may be applied prior to press-fitting, or shoulder 636 may be heated, thereby enlarging it slightly prior to facilitate press-fitting.

Figure 10:
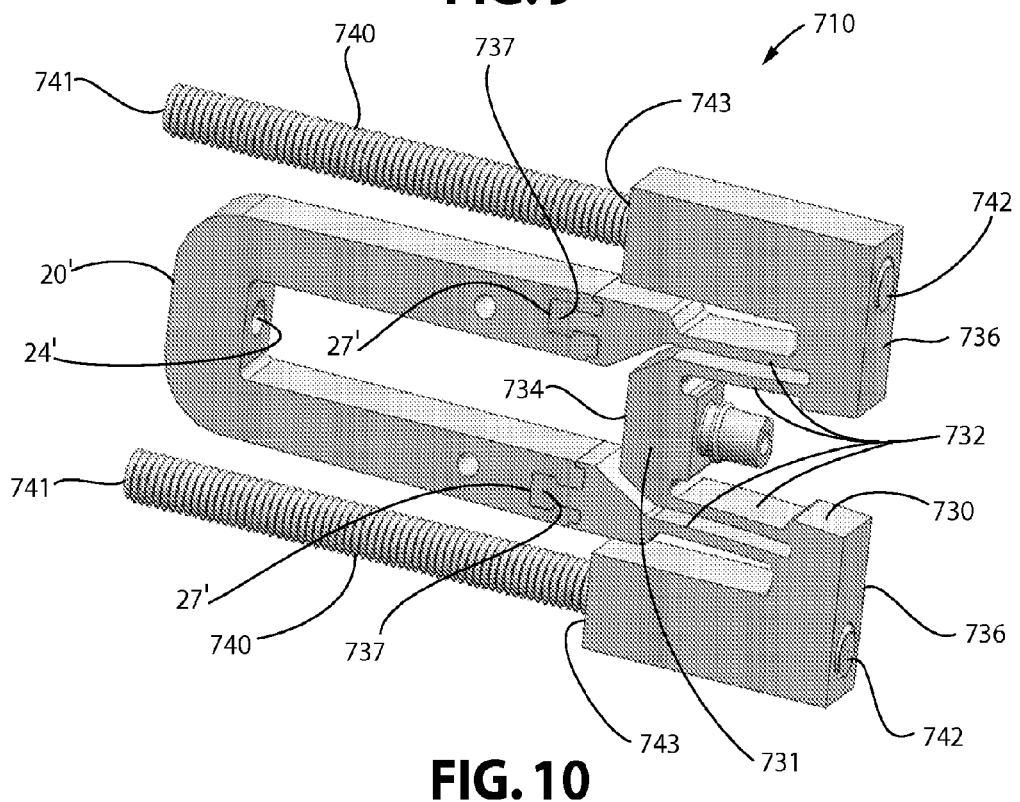
FIG. 10 is a perspective view of a preferred embodiment of an assembled mechanical amplifier suitable for use with the present invention and having threaded actuating arms.

FIG. 10 illustrates a still further attachment means. In such embodiments, mountable actuating arm 740 is threaded on the outside, such as a standard bolt or threaded rod. Shoulder 746 comprises a threaded receptacle 743 adapted to receive threaded mountable actuating arm 740. Nuts (not illustrated) may then be used to further secure mountable actuating arm 740 either at the end 742 if receptacle 743 extends through shoulder 736, or at the point where mountable actuating arm 740 enters receptacle 743. If two such nuts (not shown) are utilized, then receptacle 743 need not be threaded internally. It is also apparent that whether receptacle 743 extends entirely through shoulder 736 or only partially through shoulder 736 is a matter of choice. Such embodiments have the advantages of allowing pre-existing threaded rod to be cut to size and used as mountable actuating arm 740, and allowing for the use of standard threaded attachments in connecting actuating end 741 to devices to be actuated or sources of mechanical motion.

Figure 11:
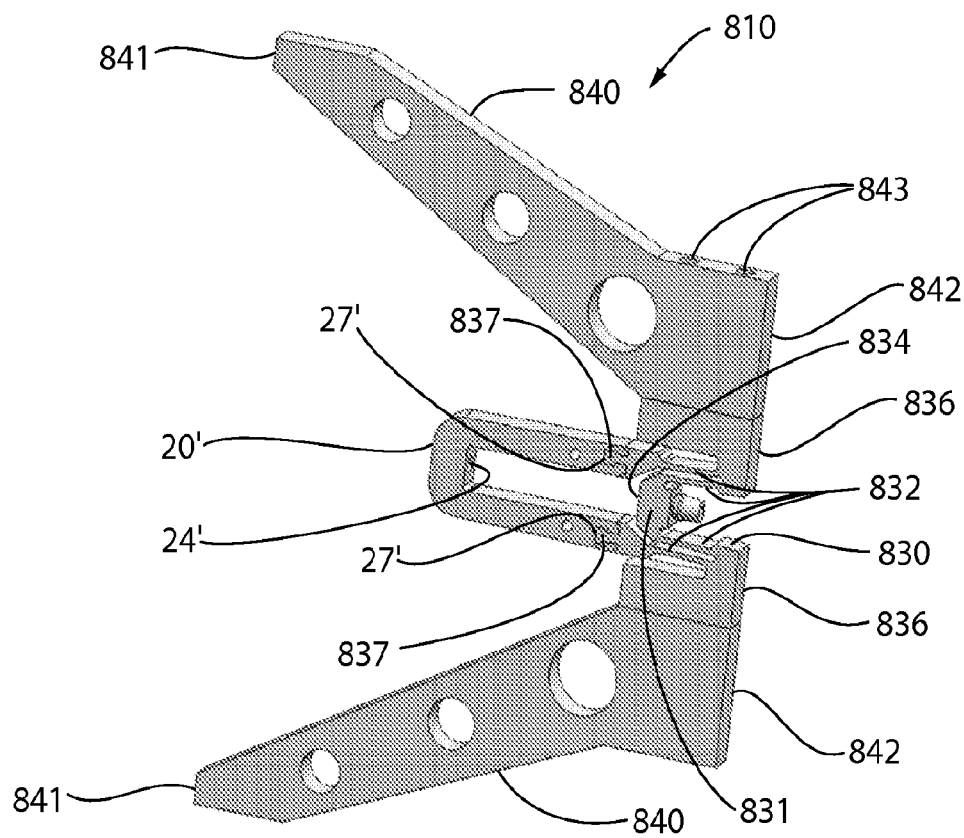
FIG. 11 is a perspective view of a preferred embodiment of an assembled mechanical amplifier suitable for use with the present invention and having angled actuating arms mounted with mechanical fasteners.
Figure 12:
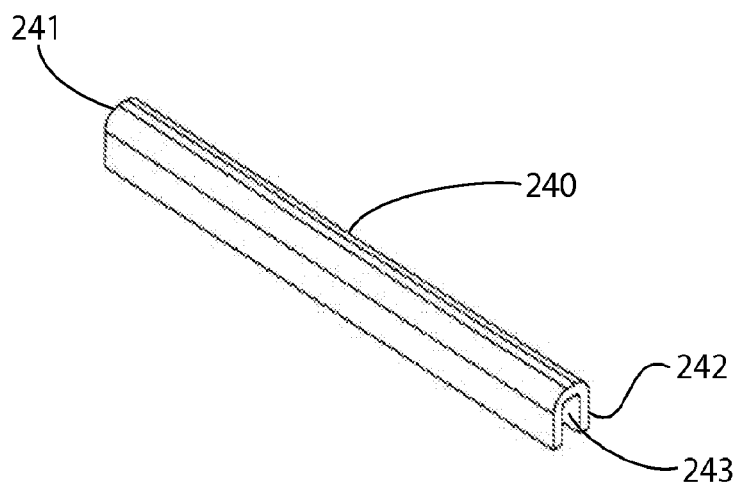
FIG. 12 is a perspective view of the channel-shaped actuating arm shown in FIG. 5.
Figure 13:
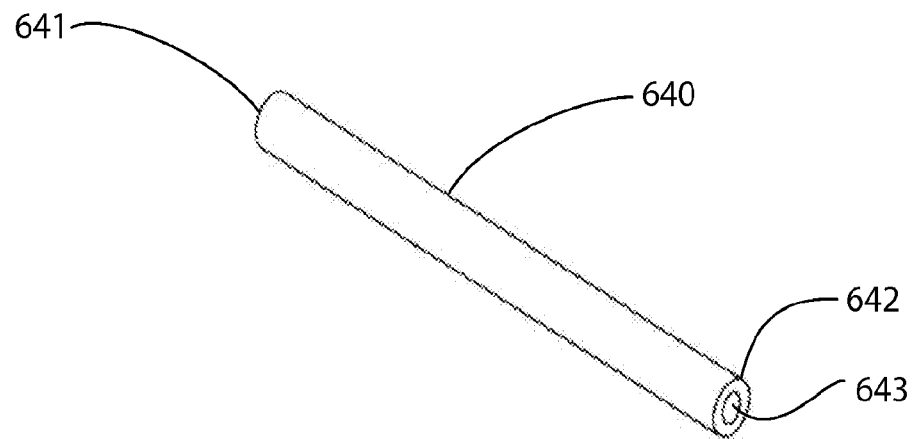
FIG. 13 is a perspective view of the hollow actuating arm shown in FIG. 9.
Figure 14:
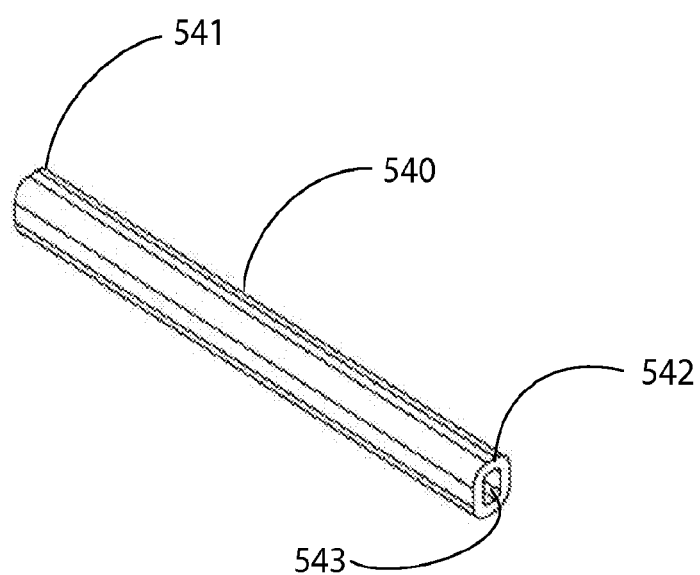
FIG. 14 is a perspective view of the hollow actuating arm shown in FIG. 8.

FIG. 11 illustrates a still further attachment means in which mountable actuating arm 840 comprises at least one and preferably two or more holes 843 extending through mountable actuating arm 840. Mechanical fasteners (not shown) may then pass through holes 843 and into shoulder 836, thereby securely mounting mountable actuating arm 840 to mechanical webs 830.

FIG. 11 also illustrates how mountable actuating arms 840 may be virtually any shape. As shown in the figure, mountable actuating arms 840 are angled out, thereby increasing the distance between actuating ends 841. Thus it is clear that mountable actuating arms 40-840 are not restricted to the shapes and relative dimensions herein illustrated and discussed. This further illustrates the advantage of the mountable arm smart material actuator of the present invention as it demonstrates how the same fixed supporting member 20, 20' and mechanical webs 30-830 may be used with many different types and sizes of mountable actuating arms.

The mountable arm smart material actuator of the present invention further provides a means to attach mountable actuating arm 40-840 to an external structure. Such external structures may include apparatus to be actuated (e.g. a valve or a pump) or a source of mechanical motion from which electrical energy is to be harvested (e.g. a pump housing).

FIGS. 15-18 illustrate certain preferred embodiments of means to attach mountable actuating arm 240 to an external structure. It will be understood that, while the means are illustrated and described herein in connection with mountable actuating arm embodiment 240, they are easily adaptable to other mountable actuating arm embodiments 40, 140, 340, 440, 540, 640, 740, 840 either by adding a channeled section at the actuating ends of such embodiments, or otherwise adapting the means to attach to an external structure described below to attach to said arms. Such adaptations will be apparent to those of ordinary skill in the art.

Figure 15:
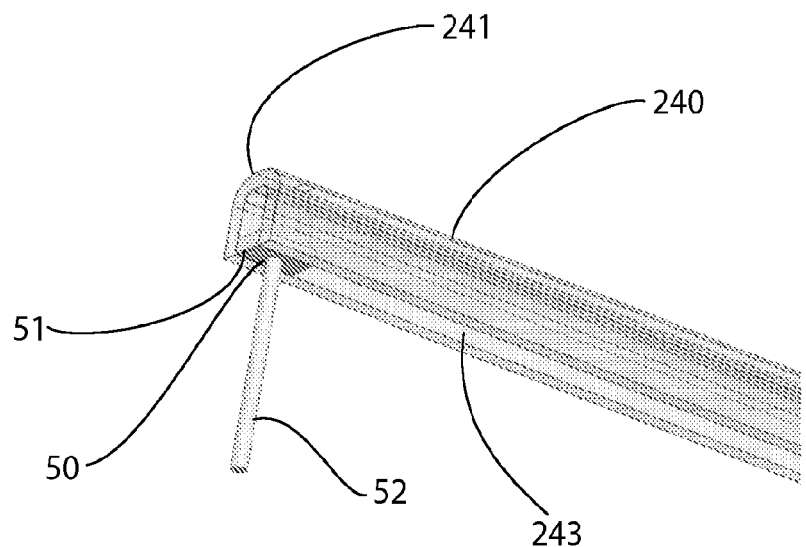
FIG. 15 is a phantom perspective view of the actuating end of the actuating arm illustrated in FIG. 12 having a fixed post-shaped connecting extension.

FIG. 15 illustrates one such embodiment of a means 50 to attach a mountable actuating arm 240 to an external structure, said means comprising a mounting block 51 press-fit into the channel 246 of mountable actuating arm 240. By adapting mounting block 51 to be the same width as, or slightly wider than, the width of channel 243 of mountable actuating arm 240, mounting block 51 may be press fit into channel 243. In certain embodiments, the friction of such mounting will provide sufficient strength. In others, welding, adhesives, or mechanical fasteners such as clamps or set screws (not shown) may be used to strengthen the mounting.

Mounting block 51 may further comprise post 52 extending therefrom. It is understood that post 52 may extend out in a variety of directions and need not extend downward, perpendicular to mountable actuating arm 240, as is shown in the figure. It will be further understood that post 52 may be a component of a mechanical device such as a pump or valve stem, may be threaded (not shown), and may be any shape (square, triangular, round, octagonal, etc.). In the case where post 52 is not threaded, it may be attached to an external structure by welding, adhesives or mechanical clamping, thereby creating a sufficiently strong connection.

Figure 18:
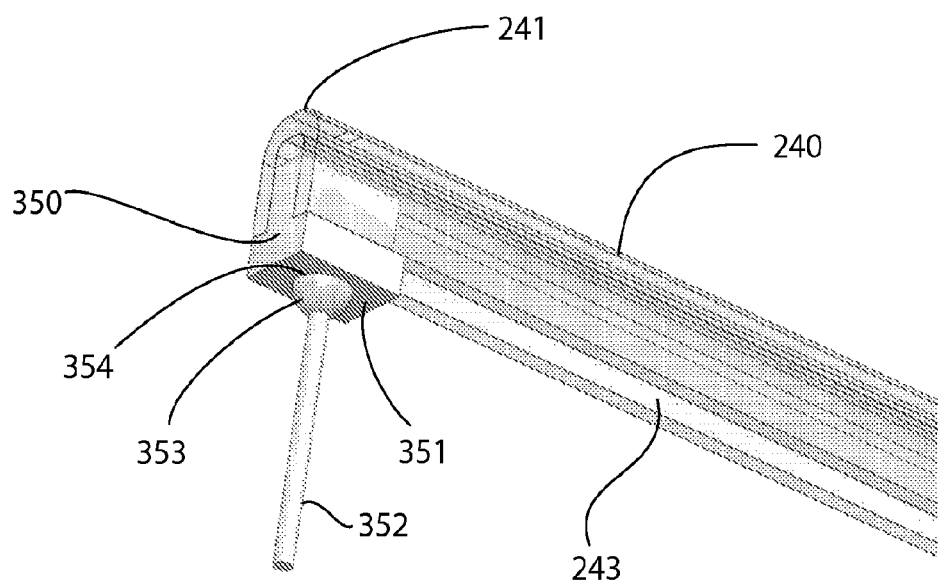
FIG. 18 is a phantom perspective view of the actuating end of the actuating arm illustrated in FIG. 12 having a ball-mounted, post-shaped connecting extension.

FIG. 18 illustrates a further means 350 to attach a mountable arm to an external structure that is similar to means 50, but allows additional degrees of freedom. Mounting block 351 is similarly press fit into the channel 243 of mountable actuating arm 240 and comprises rounded mounting block receptacle 354 which may receive a ball structure 353 onto which post 352 is attached. Receptacle 354 may be on any outer surface of mounting block 351, but is preferably on lower surface 355 as shown. Receptacle 354 and ball structure 353 are adapted to mate such that when ball structure 353 is press-fit into receptacle 354, ball structure 353 is captured but still retains freedom to move within receptacle 354. In this way, post 352 has additional degrees of freedom as mountable actuating arm 240 moves. As with post 52, post 352 may be of a variety of shapes and dimensions and may be attached to an external structure in any variety of ways including welding, mechanical fastening, clamping, and by adapting an integral part of the external structure to serve as post 352.

Figure 16:
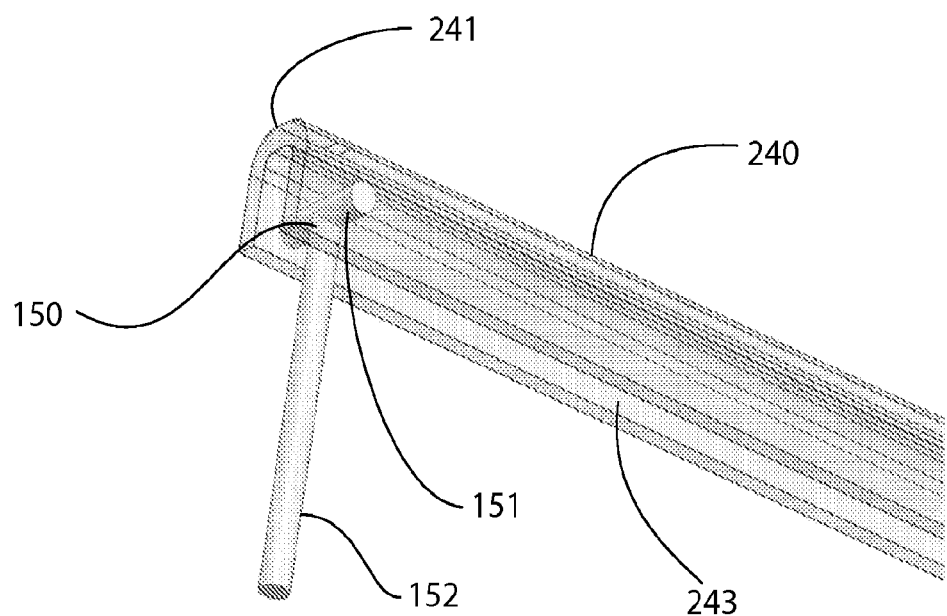
FIG. 16 is a phantom perspective view of the actuating end of the actuating arm illustrated in FIG. 12 having a partially rotating post-shaped connecting extension.

FIG. 16 illustrates a similar means 150 to attach mountable actuating arm 240 to an external structure in which post 152 is attached to rod 151. Rod 151 is adapted to be press fit into recesses or holes in actuating end 241 of mountable actuating arm 240 such that rod 151 is captured, but may still rotate to a certain degree. In this way, post 152 may move in an arc as actuating end 241 moves, but resists side to side movements. As with posts 52, 352, post 152 may be a variety of sizes and configurations, and may attach to an external structure in a variety of ways that will be apparent to those of skill in the art.

Figure 17:
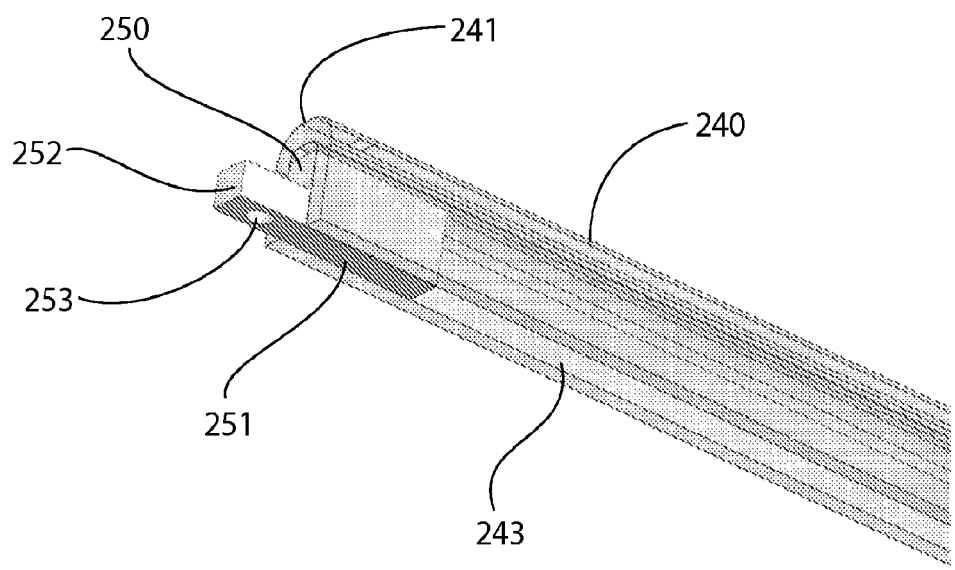
FIG. 17 is a phantom perspective view of the actuating end of the actuating arm illustrated in FIG. 12 having a mounting block connecting extension.

A further means 250 to attach mountable actuating arm 240 to an external structure is illustrated in FIG. 17 in which mounting block 251 is again press-fit into channel 243 of mountable actuating arm 240 at or proximate to actuating end 241. Mounting block 251 further comprises extension 252 extending from mounting block 250. While the figure illustrates extension 252 extending out in the same direction as the lengthwise axis of mountable actuating arm 240, it will be apparent that extension 252 could extend in a variety of directions including downward from lower surface 255 or from any direction in between. Extension 252 comprises at least one mounting hole 254 which may be used to facilitate connection with an external structure, typically with a mechanical fastener (not illustrated) extending through hole 254.

Figure 19:
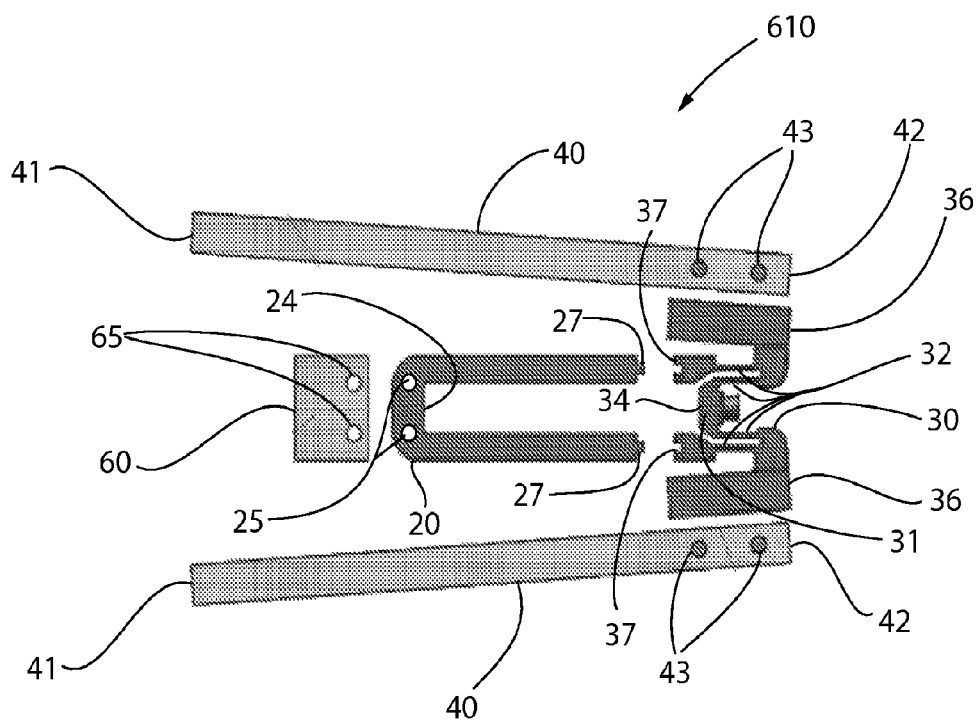
FIG. 19 is an exploded side view the mechanical amplifier of FIG. 1 having a mounting block attachable to the fixed supporting member.
Figure 20:
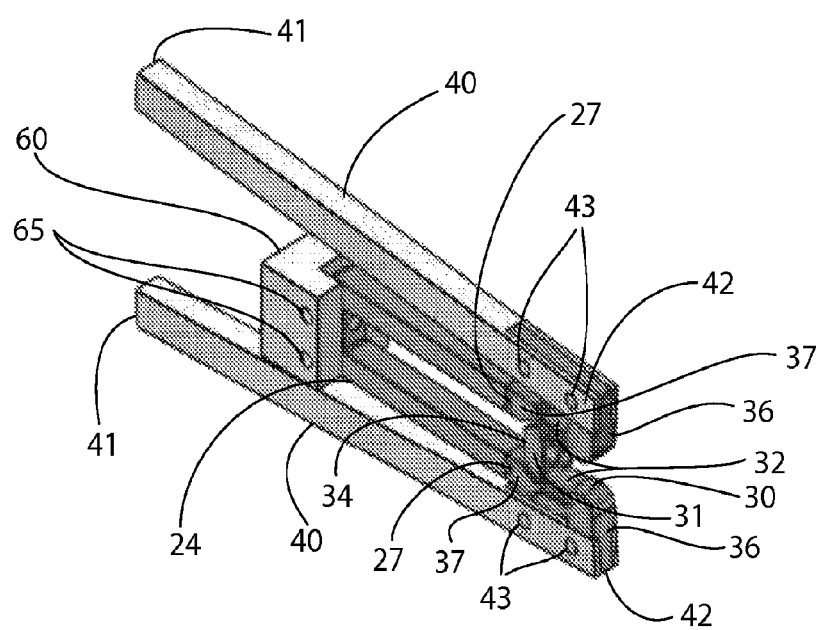
FIG. 20 is a perspective view of the mechanical amplifier of the embodiment shown in FIG. 19 when assembled.

As is illustrated in FIGS. 19 and 20, where two mountable actuating arms 40-840 are used, it may be desirable to attach mechanical amplifier 10-810 to an external structure through fixed supporting member 20, 20'. This may be accomplished by attaching mounting block 60 to fixed supporting member 20, 20' as illustrated, and then attaching mounting block 60 to an external structure through means well understood in the art. As shown, mounting block 60 comprises holes 65 adapted to align with optional holes 25 in fixed supporting member 20, 20'. Then mechanical fasteners (not shown) may be passed through holes 65 and 25 to secure mounting block 60, or through fixed mounting block 60 and against fixed supporting member 20, 20'. In this way, actuator 1 may be attached to a preferably rigid external structure which will provide an opposing force against which mountable actuating arms 40-840 may operate. This is an alternative to including only one mountable actuating arm 40-840 and fixedly mounting the other shoulder 36-836 to an external structure. Mounting to an external structure is often desirable as such structure may then provide an opposing force, thereby enabling mountable actuating arm 40-840 to move an external mechanism as opposed to moving the remainder of actuator 1.

It is known that devices such as actuators will resonate when operated at certain frequencies. In certain applications, it is desirable to avoid resonance as resonant operation can introduce additional stresses. In other situations, resonant operation may be desirable as it can be used to increase efficiency and reduce power consumption. The frequency at which an actuator will resonate will depend in part on the mass of the actuator and how that mass is distributed. Accordingly, the present invention provides an additional advantage of allowing for a method of tuning the resonant frequency of a smart material actuator.

To adjust the resonant frequency of a smart material actuator having mountable actuating arms, it is necessary to select an arm 40-840 or arms 40-840 with a predetermined mass and then mount the arms on mechanical webs 30-830 as has been described above. If the resonant frequency is too low, it can be increased by removing the selected mountable actuating arm 40-840 and selecting and attaching an arm 40-840 having a lower mass. Similarly, if it is desirable to lower the resonant frequency an arm 40-840 with higher mass may be selected. In this way, the resonant frequency may be increased or decreased as needed without replacing the entire actuator.

A further advantage of the present invention is that it allows for a smart material actuator to be used to create vibration. Because of the fast reaction and return times of piezoelectric materials, it is possible to run actuator 1 at high speeds. In this way, one may create vibration of a given frequency by selecting a mountable actuating arm 40-840 with a predetermined mass, mounting the actuating arm 40-840 on mechanical webs 30-830 as is described above, and then repeatedly activating and deactivating piezoelectric stack 100 at the desired frequency. By allowing play in the connection between mountable actuating arm 40-840 and shoulders 36-836, a chaotic and seemingly random component can be introduced into the frequency of vibration.

Finally, the ability to select and mount actuating arms 40-840 of different sizes, materials and configurations, allows greater flexibility in energy harvesting applications. By identifying a source of mechanical motion and determining the predicted maximum amplitude of that motion (i.e. the distance over which the object will move), and determining the maximum mechanical force the object is likely to generate, a required stroke length and blocking force (the force resisting compression of piezoelectric stack 100) is readily determined. By then selecting a smart material actuator with a predetermined stroke length and blocking force, the needed size and mass of a mountable actuating arm 40-840 can be determined. Mounting such an arm on mechanical webs 30-830 and attaching actuating end 41-841 to the source of mechanical motion and the remainder of actuator 1 (either through fixed supporting member 20, 20' or an unused shoulder 36-836) to a substantially rigid mount, actuator 1 is adapted to serve as an efficient energy harvesting apparatus. Energy is then harvested by connecting piezoelectric stack 100 to an electrical load such as an energy storage device (e.g. a rechargeable battery) or a potentially additive power circuit. If the typical frequency range of mechanical motion can be determined, the efficiency of energy harvesting may be increased by selecting mountable actuating arm 40-840 as is described above such that actuator 1 resonates at a frequency within the determined frequency range. Resonant operation such as this can have the effect of increasing efficiency as it reduces the external force necessary to create a given level of compression on piezoelectric stack 100 once resonance is established.

While the present invention has been described in conjunction with what are presently considered to be the most practical and preferred embodiments, this invention is not limited to those embodiments, but instead is intended to encompass all of the various modifications to, and variations on those embodiments, and all equivalent arrangements, within the scope and spirit of the appended claims, which scope is to be accorded the broadest interpretation permitted under law.

I claim:

1. A smart material actuator assembly kit comprising a at least one fixed supporting member having a first mounting surface,
    at least one mechanical web comprising a movable supporting member having a second mounting surface, at least one compliant member, and a means of mounting an actuating arm, and at least one mountable actuating arm affixable to said means of mounting an actuating arm;
    said kit further comprising at least one piezoelectric stack affixable between said first mounting surface and said second mounting surface; wherein said fixed supporting member is substantially rigid and is affixable to said mechanical web such that said first mounting surface and said second mounting surface are substantially parallel and upon application of an electrical potential to said multilayer piezoelectric material, said multilayer piezoelectric material expands substantially without movement of said fixed supporting member and substantially without angular movement of said piezoelectric stack;
    whereby substantially upon application of an electric potential to said piezoelectric stack in a smart material actuator comprising one said fixed supporting member attached to one said mechanical web with said piezoelectric stack affixed between said first mounting surface and said second mounting surface, and at least one said actuating arm attached to said mechanical web, said piezoelectric stack urges said second mounting surface away from said first mounting surface, thereby causing said compliant member to flex, thereby moving said mountable actuating arm such that motion of at least one part of said mountable actuating arm is across a distance greater than the expansion of said piezoelectric stack.

2. The kit of claim 1 wherein said mechanical web is formed of a different material than said fixed supporting member and said mountable arm is formed of a different material than said mechanical webs.

3. The kit of claim 1 wherein said means of mounting an actuating arm comprises a plurality of mechanical fasteners extending through said mountable actuating arm and said mechanical webs substantially perpendicular to the lengthwise axis of said mountable actuating arm.

4. A smart material actuator apparatus comprising a mechanical amplifier comprising a fixed supporting member having a first mounting surface, a mechanical web comprising a movable supporting member having a second mounting surface, at least one compliant member, and a means of mounting an actuating arm, and a mountable actuating arm attached to said means of mounting an actuating arm; said actuator apparatus further comprising a piezoelectric stack affixed between said first mounting surface and said second mounting surface; wherein said fixed supporting member is substantially rigid and is attached to said mechanical web such that said first mounting surface and said second mounting surface are substantially parallel and upon application of an electrical potential to said multilayer piezoelectric material, said multilayer piezoelectric material expands substantially without movement of said fixed supporting member and substantially without angular movement of said piezoelectric stack; whereby substantially upon application of an electric potential to said piezoelectric stack, said piezoelectric stack urges said second mounting surface away from said first mounting surface, thereby causing said compliant member to flex, thereby moving said mountable actuating arm such that motion of at least one part of said mountable actuating arm is across a distance greater than the expansion of said piezoelectric stack wherein said means of attaching said mountable actuating arm comprises a mechanical fastener extending through said mechanical web and into said mountable actuating arm substantially parallel to the lengthwise axis of said mountable actuating arm.

5. The kit of claim 1 wherein said mechanical web further comprises an extension and said mountable actuating arm further comprises a receptacle adapted to be press-fit onto said extension.

6. The kit of claim 5 wherein said mountable actuating arm comprises an inside perimeter and an outside perimeter, said receptacle being formed by said inside perimeter and said inside perimeter being substantially equal in size to said extension.

7. A smart material actuator apparatus comprising a mechanical amplifier comprising a fixed supporting member having a first mounting surface, a mechanical web comprising a movable supporting member having a second mounting surface, at least one compliant member, and a means of mounting an actuating arm, and a mountable actuating arm attached to said means of mounting an actuating arm
wherein said mountable actuating arm comprises a channel and a mounting block press fit into said channel; said actuator apparatus further comprising a piezoelectric stack affixed between said first mounting surface and said second mounting surface; wherein said fixed supporting member is substantially rigid and is attached to said mechanical web such that said first mounting surface and said second mounting surface are substantially parallel and upon application of an electrical potential to said multilayer piezoelectric material, said multilayer piezoelectric material expands substantially without movement of said fixed supporting member and substantially without angular movement of said piezoelectric stack; whereby substantially upon application of an electric potential to said piezoelectric stack, said piezoelectric stack urges said second mounting surface away from said first mounting surface, thereby causing said compliant member to flex, thereby moving said mountable actuating arm and said mounting block such that motion of at least one part of said mountable actuating arm is across a distance greater than the expansion of said piezoelectric stack.

8. The apparatus of claim 7 wherein said mounting block further comprises a downwardly extending post.

9. The apparatus of claim 7 wherein said mounting block comprises a rounded mounting block receptacle and a movable post having a post end and a ball structure adapted to be captured by said mounting block receptacle such that said ball structure may move within said rounded mounting block receptacle.

10. The apparatus of claim 7 wherein said mounting block comprises an extension extending beyond the end of said mountable actuator arm and having at least one mounting hole.

11. The apparatus of claim 7 wherein said mounting block comprises a rod press fit into said channel, said rod having a post extending substantially perpendicularly from said rod, and said channel and said rod being adapted such that said rod may rotate within said channel.

12. A method of creating vibration using a smart material actuator comprising a mechanical amplifier comprising a fixed supporting member having a first mounting surface, a mechanical web comprising a movable supporting member having a second mounting surface, a compliant member, and a means of mounting an actuating arm, and at least one mountable actuating arm attached to said means of mounting an actuating arm; said actuator apparatus further comprising a piezoelectric stack affixed between said first mounting surface and said second mounting surface; wherein said fixed supporting member is substantially rigid and is attached to said mechanical web such that said first mounting surface and said second mounting surface are substantially parallel and upon application of an electrical potential to said piezoelectric stack, said piezoelectric stack expands substantially without movement of said fixed supporting member and substantially without angular movement of said piezoelectric stack; said method comprising the steps of selecting a mountable actuating arm with a predetermined mass, and mounting said mountable actuating arm on said means of mounting an actuating arm; whereby upon repeated activation and deactivation of said multilayer, piezoelectric material, said mountable actuating arm provides a source of vibration.

13. A method of harvesting electrical energy from mechanical motion using a smart material actuator apparatus comprising a mechanical amplifier comprising a fixed supporting member having a first mounting surface, a mechanical web comprising a movable supporting member having a second mounting surface, at least one compliant member, and a means of mounting an actuating arm; and at least one mountable actuating arm attached to said means of mounting an actuating arm; said actuator apparatus further comprising a piezoelectric stack affixed between said first mounting surface and said second mounting surface; wherein said fixed supporting member is substantially rigid and is attached to said mechanical web such that said first mounting surface and said second mounting surface are substantially parallel and upon application of an electrical potential to said piezoelectric stack, said piezoelectric stack expands substantially without movement of said fixed supporting member and substantially without angular movement of said piezoelectric stack; said method comprising the steps of determining a predicted maximum amplitude of a source of mechanical motion, determining a predicted maximum mechanical force exerted by said source of mechanical motion, selecting a smart material actuator with predetermined stroke length and blocking force, and a mountable actuating arm with a predetermined size and mass, mounting said mountable actuating arm on said means of mounting an actuating arm, attaching said mountable actuating arm to a source of mechanical motion and said actuator apparatus to a substantially rigid mount, and connecting said piezoelectric stack to an electrical load; wherein said stroke length is less than or equal to said predicted maximum amplitude of said source of mechanical motion and said predicted maximum mechanical force exerted by said source of mechanical motion is less than or equal to said blocking force when said mountable actuating arm is attached to said mechanical amplifier, whereby electrical energy is harvested from said source of mechanical energy and transmitted into said electrical load by said piezoelectric stack.

14. The method of claim 13 further comprising the steps of determining a predicted frequency range of said source of mechanical motion, selecting said mountable actuating arm such that, when assembled, said smart material actuator resonates at a frequency within said predicted frequency range, whereby, substantially upon said source of mechanical motion operating at said resonant frequency, set smart material actuator resonates.

15. A method of sensing motion with a smart material actuator apparatus comprising a mechanical amplifier comprising a fixed supporting member having a first mounting surface, a mechanical web comprising a movable supporting member having a second mounting surface, at least one compliant member, and a means of mounting an actuating arm; and at least one mountable actuating arm attached to said means of mounting an actuating arm; said actuator apparatus further comprising a piezoelectric stack affixed between said first mounting surface and said second mounting surface; wherein said fixed supporting member is substantially rigid and is attached to said mechanical web such that said first mounting surface and said second mounting surface are substantially parallel and upon application of an electrical potential to said piezoelectric stack, said piezoelectric stack expands substantially without movement of said fixed supporting member and substantially without angular movement of said piezoelectric stack; said method comprising the steps of connecting said mountable actuating arm to a source of mechanical motion, reading the voltage generated by said piezoelectric stack, and using said voltage reading to indicate the amount of movement of said mountable actuating arm;

whereby said source of mechanical motion causes said mountable actuating arm to move, whereby said compliant member causes said movable supporting member to exert and release pressure on said piezoelectric stack, thereby causing said piezoelectric stack to generate an electric potential proportional to the amount of movement of said mountable actuating arm, thereby indicating the degree of motion of said mountable actuating arm.

\* \* \* \* \*